Aug. 15, 1950  B. A. DISNEY ET AL  2,519,027
MOTORCYCLE HAND SUPPORT
Filed Dec. 4, 1946
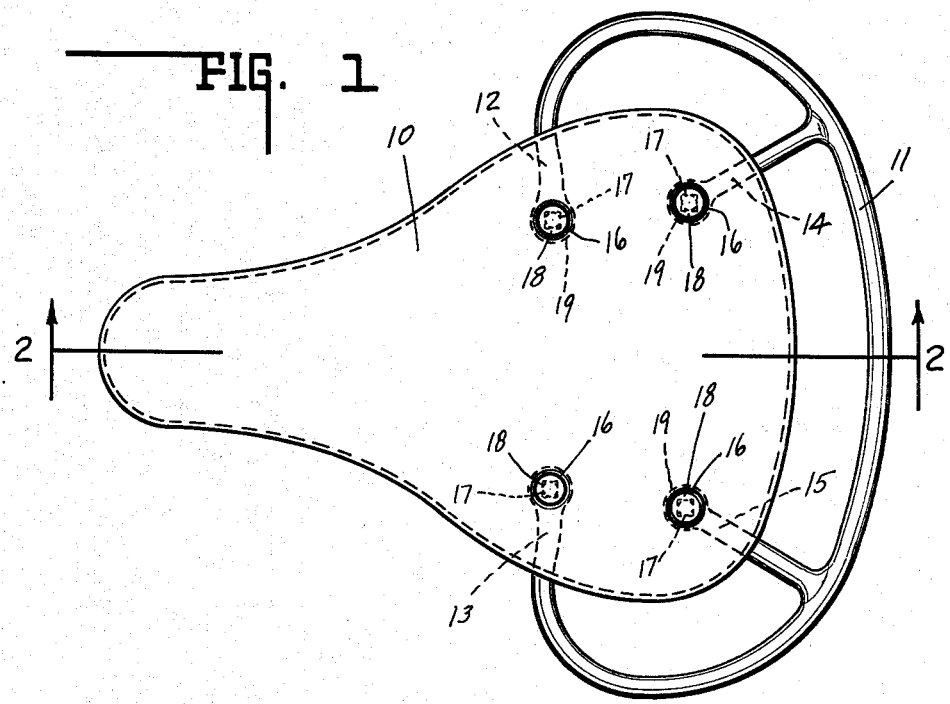
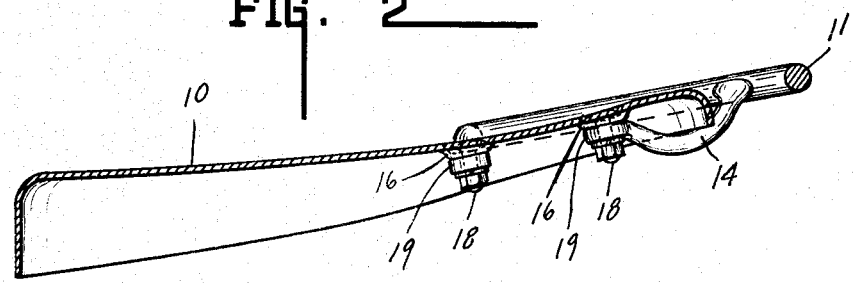
INVENTORS.
HERSHEL S. PLUMMER.
BERTRAND A. DISNEY.
BY
Lockwood Goldsmith Galt,
ATTORNEYS.

Patented Aug. 15, 1950

2,519,027

UNITED STATES PATENT OFFICE 2,519,027

MOTORCYCLE HAND SUPPORT

Bertrand A. Disney, Wanamaker, and Hershel S. Plummer, Indianapolis, Ind.; said Plummer assignor to said Disney Application December 4, 1946, Serial No. 714,052

3 Claims. (Cl. 155—5.23)

This invention relates to a hand support, seat-guard, and the like device for a motorcycle.

It frequently becomes necessary in using a motorcycle to move it bodily from one position to another, for example as when parking it near a curb. For such purposes, it is desirable to have a hand support located near the seat platform or saddle.

The object of this invention is to provide such a hand grip, so that the motorcycle may be moved with freedom and ease when desired.

A further object of this invention is to provide a hand rail which is so constructed as to serve also as a seat-guard or guard rail, particularly when the motorcycle is being ridden tandem fashion. This guard rail serves to keep the person riding tandem on the rearward portion of a dual type seat from sliding off. It also serves as a support for the second rider in addition to that afforded by the seat itself.

It is a still further object of this invention to provide a hand support, seat-guard, and the like which is an accessory rather than an integral part of a motorcycle saddle.

The full nature of the invention will be understood from the accompanying drawings and the following description and claims.

Fig. 1 is a plan view showing the invention together with a conventional seat platform which it supports.

Fig. 2 is a vertical section view taken on the line 2—2 of Fig. 1 in the direction of the arrows.

In the drawings 10 indicates the conventional pressed steel seat platform or saddle which is padded in the usual way for seating comfort. At 11 is the hand support, the contour and outline of a portion of which conforms substantially to the shape of the saddle 10. The hand support 11 has inwardly directed ends 12 and 13 and intermediate brace portions 14 and 15 which are adapted for anchorage to the underside of the saddle 10. The seat platform or saddle has depressions 16 which have polygonal apertures 17 adapted to accommodate bolts 18. The bolts 18 are of a length sufficient to extend through the apertures 17, through the bosses 19 formed on the portions 12, 13, 14, and 15, and the washers and nuts for rigidly securing the support.

Intermediately disposed between the ends 12 and 13 are inwardly directed brace portions 14 and 15 which also are apertured and adapted for anchoring to the under rearward portion of the saddle.

This invention not only affords a durable hand grip for use by the operator, but also presents a means of support for any person riding tandem on the rear of the motorcycle.

The invention claimed is:

1. A combination hand support, seat-guard, and grip apparatus for a cycle device having a saddle type seat, comprising an interrupted loop for partially enveloping the seat and having inwardly directed ends adapted for anchoring to the under portion of the seat, and intermediately disposed, inwardly directed brace portions adapted for anchoring to the under portion of the seat rearwardly of said first mentioned anchoring.

2. A combined hand support, seat-guard, and grip apparatus for a cycle device having a dual type seat, comprising an interrupted loop for partially enveloping the seat, said interrupted loop enveloping said seat in a plane above the top portion of said seat and having inwardly directed ends adapted for anchorage to the under portion of the seat and intermediately disposed inwardly directed brace portions adapted for anchorage to the under portion of the seat rearwardly of said first mentioned anchorage.

3. An apparatus as defined by claim 1 wherein said interrupted loop partially enveloping the seat is always disposed in spaced relation thereto.

BERTRAND A. DISNEY.
HERSHEL S. PLUMMER.

REFERENCES CITED

The following references are of record in the file of this patent:

UNITED STATES PATENTS

| Number | Name | Date |
| --- | --- | --- |
| 540,431 | Garford | June 4, 1895 |
| 2,433,686 | Du Pont | Dec. 20, 1947 |

FOREIGN PATENTS

| Number | Country | Date |
| --- | --- | --- |
| 368,449 | Italy | of 1939 |